United States Patent
Landgraf

(10) Patent No.: US 10,686,758 B2
(45) Date of Patent: Jun. 16, 2020

(54) ELASTIC OUTBOUND GATEWAY

(71) Applicant: Sophos Limited, Abingdon (GB)

(72) Inventor: Vincent Maurice Landgraf, Keltern (DE)

(73) Assignee: Sophos Limited, Abingdon (GB)

(\*) Notice: Subject to any disclaimer, the term of this patent is extended or adjusted under 35 U.S.C. 154(b) by 148 days.

(21) Appl. No.: 15/636,692

(22) Filed: Jun. 29, 2017

(65) Prior Publication Data

US 2018/0007002 A1  Jan. 4, 2018

(30) Foreign Application Priority Data

Jun. 30, 2016 (GB) .................................. 1611403.5

(51) Int. Cl.
*H04L 29/06* (2006.01)
*H04L 12/24* (2006.01)
(Continued)

(52) U.S. Cl.
CPC .......... *H04L 63/0218* (2013.01); *H04L 12/66* (2013.01); *H04L 41/0806* (2013.01);
(Continued)

(58) Field of Classification Search
CPC ............. H04L 63/0218; H04L 63/0263; H04L 63/145; H04L 63/0272; H04L 12/66; H04L 12/26; H04L 41/0806; H04L 41/0893; H04L 29/06; H04L 29/08; H04L 67/1036; H04L 43/16
(Continued)

(56) References Cited

U.S. PATENT DOCUMENTS 6,687,735 B1 * 2/2004 Logston .................... G06F 8/60
                                                    370/486
7,372,850 B1 * 5/2008 Chen ................... H04L 12/6418
                                                    370/356
(Continued)

FOREIGN PATENT DOCUMENTS

EP        2874376        5/2015

OTHER PUBLICATIONS

"Onur Demir", [Increasing Server Reliability and Performance Using Smart Gateways], 2007 Dissertation (Year: 2007).*
(Continued)

*Primary Examiner* — Saleh Najjar
*Assistant Examiner* — Khalid M Almaghayreh
(74) *Attorney, Agent, or Firm* — Strategic Patents, P.C.

(57) ABSTRACT

In general, in an aspect, a method for providing an outbound gateway protection includes provisioning one or more worker gateways located in a first gateway virtual private cloud, the one or more worker gateways sharing configuration data with the controller gateway, provisioning one or more load balancer gateways in one or more client virtual clouds, the one or more client virtual clouds each comprising one or more clients, the one or more load balancer gateways distributing client requests among the worker gateways, assigning groups of the one or more clients to one of the one or more load balancer gateways based on requests from a majority of the worker gateways, and communicating outbound network traffic from the clients via the assigned load balancer gateways.

13 Claims, 11 Drawing Sheets

(51) Int. Cl.
*H04L 12/66* (2006.01)
*H04L 29/08* (2006.01)
*H04L 12/26* (2006.01)

(52) U.S. Cl.
CPC ...... *H04L 41/0893* (2013.01); *H04L 63/0263* (2013.01); *H04L 63/145* (2013.01); *H04L 67/1036* (2013.01); *H04L 43/16* (2013.01); *H04L 63/0272* (2013.01)

(58) Field of Classification Search
USPC .......... 726/11–12, 2, 27; 709/231–232, 238, 709/249; 710/1, 20–21, 29, 31, 36
See application file for complete search history.

(56) References Cited

U.S. PATENT DOCUMENTS

| | | | | |
|---|---|---|---|---|
| 8,639,989 | B1* | 1/2014 | Sorenson, III | H04L 67/125 709/224 |
| 9,577,845 | B2* | 2/2017 | Thakkar | H04L 12/66 |
| 9,692,729 | B1* | 6/2017 | Chen | H04L 63/0272 |
| 9,813,379 | B1* | 11/2017 | Shevade | H04L 63/0272 |
| 10,135,789 | B2* | 11/2018 | Mayya | H04L 45/42 |
| 2002/0078209 | A1* | 6/2002 | Peng | H04L 29/06 709/227 |
| 2004/0071087 | A1* | 4/2004 | Siev | H04L 29/12009 370/235 |
| 2005/0188065 | A1* | 8/2005 | O'Rourke | H04L 12/4633 709/223 |
| 2008/0125117 | A1* | 5/2008 | Jiang | H04W 8/12 455/433 |
| 2012/0266231 | A1* | 10/2012 | Spiers | H04L 63/0218 726/12 |
| 2013/0073743 | A1* | 3/2013 | Ramasamy | H04L 67/1027 709/238 |
| 2015/0142866 | A1* | 5/2015 | Dong | G06F 16/1824 709/201 |
| 2015/0249644 | A1* | 9/2015 | Xu | H04L 63/0272 726/1 |
| 2015/0339136 | A1* | 11/2015 | Suryanarayanan | G06F 9/455 718/1 |
| 2016/0128043 | A1* | 5/2016 | Shuman | H04W 72/044 370/331 |
| 2017/0070599 | A1* | 3/2017 | Bute | H01L 21/28088 |
| 2017/0212707 | A1* | 7/2017 | Hildebrand | G06F 3/0617 |
| 2017/0214738 | A1* | 7/2017 | Agarwal | H04L 67/1002 |
| 2018/0019969 | A1* | 1/2018 | Murthy | H04L 61/2084 |

OTHER PUBLICATIONS

IPO, "Application No. GB1611403.5 Search Report dated Feb. 7, 2017", 4 pages.

* cited by examiner

```
601    Nets = [:A, :B, :C]

602    # Number = Load Balancer ID, Array = Preferred Networks
603    Config = {
604      1 => [:A, :B],
605      2 => [:C],
606      3 => [:A, :B],
607    }

608    # Number = Load Balancer ID, true = online, false = offline
609    State = {
610      1 => true,
611      2 => true,
612      3 => false,
613    }

614    def find_route(net)
615      Config.each do |Load Balancer ID, nets|
616        if nets.include?(net) && State[Load Balancer ID]
617          return Load Balancer ID
618        end
619      end
620      State.each do |Load Balancer ID, connected|
621        return Load Balancer ID  if connected
622      end
623    end 624    Nets.each do |net|
625      puts "ROUTE #{net} -> #{find_route(net)}"
626    end
```

FIG. 6

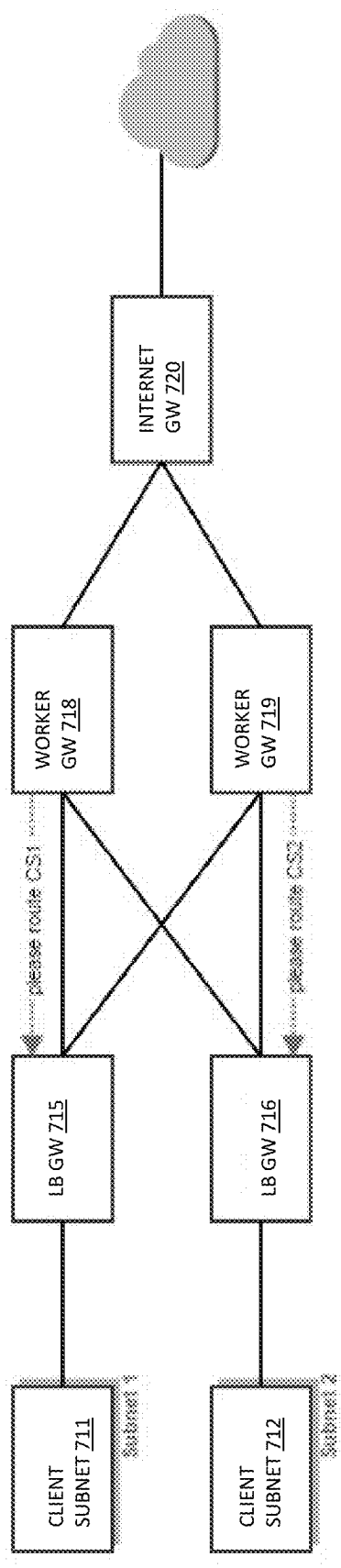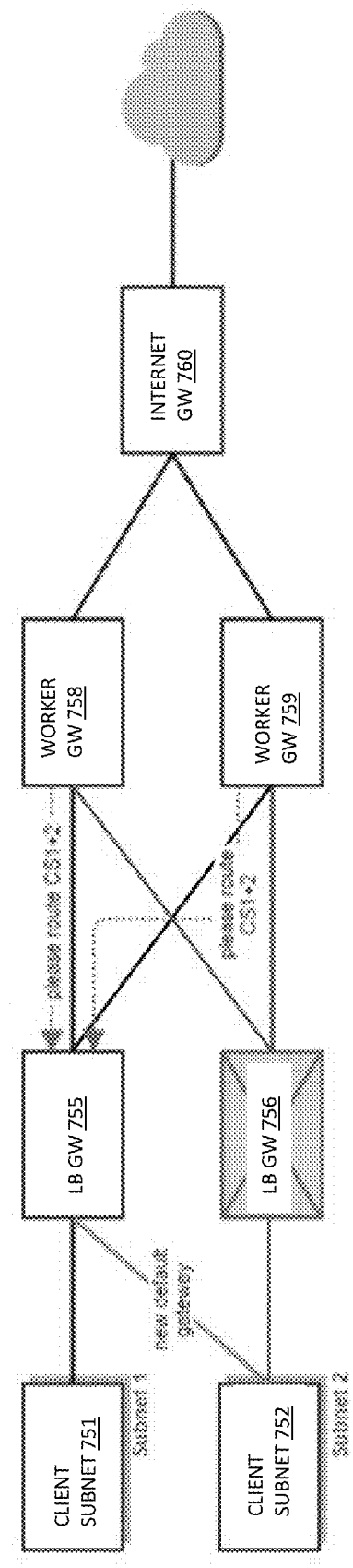
FIG. 7

FIG. 10

ELASTIC OUTBOUND GATEWAY

CROSS-REFERENCE TO RELATED APPLICATIONS

This application claims priority to United Kingdom Pat. App. No. 1611403.5 filed on Jun. 30, 2016, which is incorporated herein by reference in its entirety.

TECHNICAL FIELD

This application relates to computer network protection in cloud infrastructure.

BACKGROUND

Cloud computing services have become increasingly popular. Cloud services providers include Amazon Web Services (AWS), Microsoft Azure, CenturyLink Cloud, Rackspace, Joyent, and Google, each of which offer a variety of services including compute, storage, networking, database, analytics, applications, deployment, management, developer tools, etc. Cloud computing services provide computing capacity as an alternative to building an actual physical computing farm. Yet, there remains a need for improved techniques for protecting against malware and malicious activity when using cloud computing infrastructure services.

SUMMARY

One of the benefits of cloud infrastructure implementations is that instances of network resources may be started and stopped on demand, manually or automatically, for example, based on load or anticipated need. It may be beneficial in a cloud environment to provide outbound gateway protection that can flexibly handle traffic as resources are added, removed, have increased or decreased activity, experience network or instance interruption, etc. A goal of such a cloud protection system may be to provide both a flexible load capability and fault tolerance.

In general, in one aspect, a method for providing an outbound gateway system includes provisioning one or more worker gateways located in a first gateway virtual private cloud, the one or more worker gateways receiving configuration data from a controller gateway, provisioning one or more load balancer gateways in one or more client virtual clouds, the one or more client virtual clouds each including one or more clients, the one or more load balancer gateways distributing client requests among the worker gateways, assigning groups of the one or more clients to one of the one or more load balancer gateways based on requests from a majority of the worker gateways, and communicating outbound network traffic from the clients via the assigned load balancer gateways.

In some implementations, the one or more worker gateways provide network firewall protection for outbound traffic. In some implementations, the one or more worker gateways are located in the first gateway virtual private cloud and one or more worker gateways are located in a second gateway virtual private cloud. In some implementations, each load balancer gateway reports status information to a controller gateway. In some implementations, the requests are based on requests from worker gateways that meet a threshold age. In some implementations, each worker gateway transmits requests when changes to the network are needed. In some implementations, each worker gateway transmits a request upon a failure of one of the load balancer gateways to report. In some implementations, routing requests are counted by each load balancer gateway. In some implementations, the load balancer gateway requests traffic for a subnet based on requests from a majority of worker gateways.

In general in one aspect, a network protection system includes worker gateways provisioned in a first gateway virtual private cloud and one or more client virtual clouds including one or more clients and one or more load balancer gateways, wherein client subnets are assigned to one of the load balancer gateways by a vote of the worker gateways, and each load balancer gateway that is assigned to a client subnet distributes traffic from the client subnet among the worker gateways. In some implementations, the one or more worker gateways provide network protection for outbound traffic. In some implementations, the one or more worker gateways are located in the first gateway virtual private cloud and a second gateway virtual private cloud. In some implementations, each load balancer gateway reports status information to a controller gateway. In some implementations, the vote is based on requests from worker gateways that meet a threshold age.

In some implementations, each worker gateway votes when changes to the network are needed. In some implementations, each worker gateway sends a request upon a failure of one of the load balancer gateways to report. In some implementations, routing requests are counted by each load balancer gateway. In some implementations, the load balancer gateway requests traffic for a subnet based on requests from a majority of worker gateways.

In general, in an aspect, a system for cloud network protection includes a first non-transitory computer-readable medium including a template for a worker gateway deployable in a first virtual private cloud and configurable to receive outbound network traffic, and a second non-transitory computer-readable medium including a template for a load balancer gateway deployable in a second virtual private cloud different from the first virtual private cloud, the load balancer gateway configurable to be assigned to one or more client subnets in the second virtual private cloud, wherein the load balancer gateway is assigned to a client subnet gateway by requests of worker gateways.

In some implementations, one or more worker gateways provide firewall network protection for outbound traffic. In some implementations, one or more worker gateways are located in the first gateway virtual private cloud and one or more worker gateways are located in a second gateway virtual private cloud. In some implementations, each load balancer gateway reports status information to a controller gateway. In some implementations, the requests are requests from worker gateways that meet a threshold age. In some implementations, each worker gateway votes when changes to the network are needed. In some implementations, each worker gateway sends a request to one of the load balancer gateways upon a failure of one of the load balancer gateways to report. In some implementations, routing requests are counted by each load balancer gateway. In some implementations, the load balancer gateway requests traffic for a subnet based on a request from a majority of worker gateways.

BRIEF DESCRIPTION OF THE FIGURES

The foregoing and other objects, features and advantages of the devices, systems, and methods described herein will be apparent from the following description of particular

FIG. 6 illustrates an example implementation.

FIG. 7 illustrates an example implementation.

FIG. 10 shows an example screen display in an example implementation.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

Figure 1:
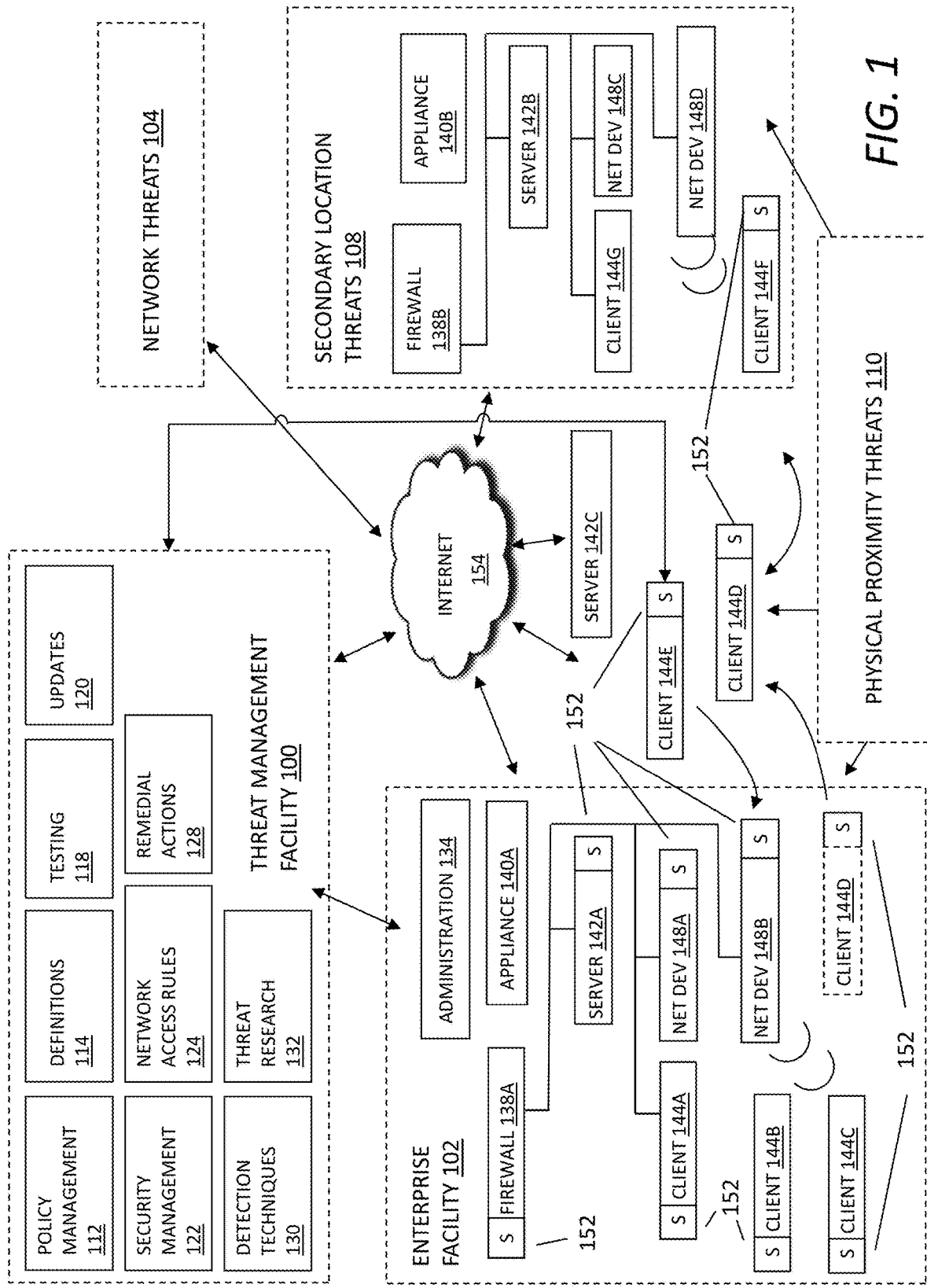
FIG. 1 illustrates an environment for threat management.

FIG. 1 illustrates an environment for threat management. Specifically, FIG. 1 depicts a block diagram of a threat management system providing protection against a plurality of threats—a context in which the disclosed techniques may usefully be deployed. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate or personal assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management facility 100.

Over recent years, malware and associated compromise of assets has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, cloud desktops, servers, firewall gateways, communication ports, handheld or mobile devices, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so has the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every hour, every 15 minutes, five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach. It should be understood that an enterprise model is applicable to organizations and users of any size or type. For example, an enterprise may be or may include a group or association of endpoints, networks, users, and the like within or outside of one or more protected locations. It should be understood that an enterprise may include one or more offices or business locations, or one or more homes, where each location, or portions of each location, or a collection of locations may be treated as a client facility.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security facility 122 and policy management facility 112 may push information to the enterprise facility 102 network and/or client facility. The enterprise facility 102 network and/or client facility may also or instead pull information from the security facility 122 and policy management facility 112 network server facilities 142, or there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

A definition management facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may retrieve predefined rule sets from a remote provider of a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may perform or initiate a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURT, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
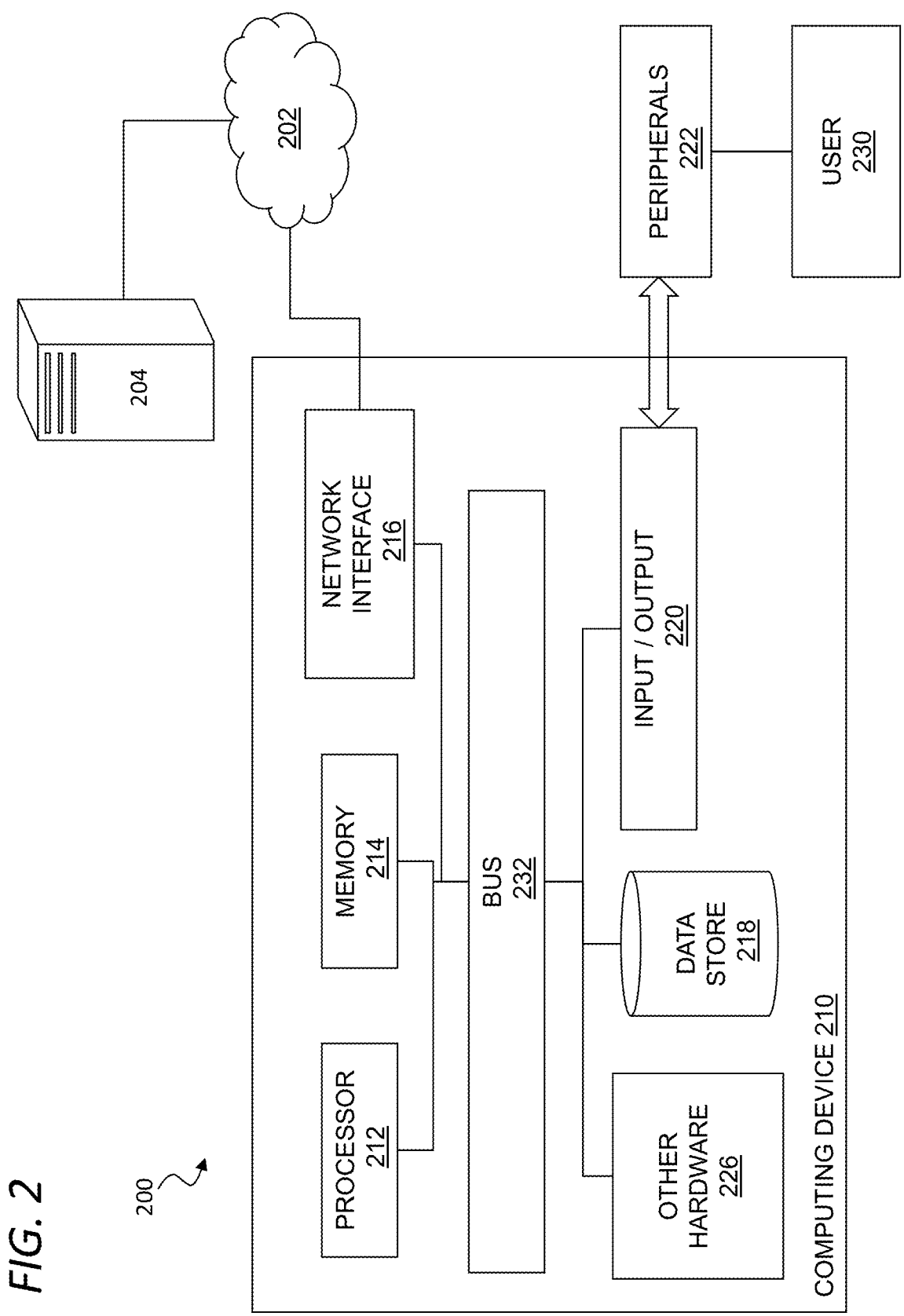
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may be used for any of the entities described in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware (e.g., in a desktop computer), software (e.g., in a virtual machine or the like), or a combination of software and hardware, and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
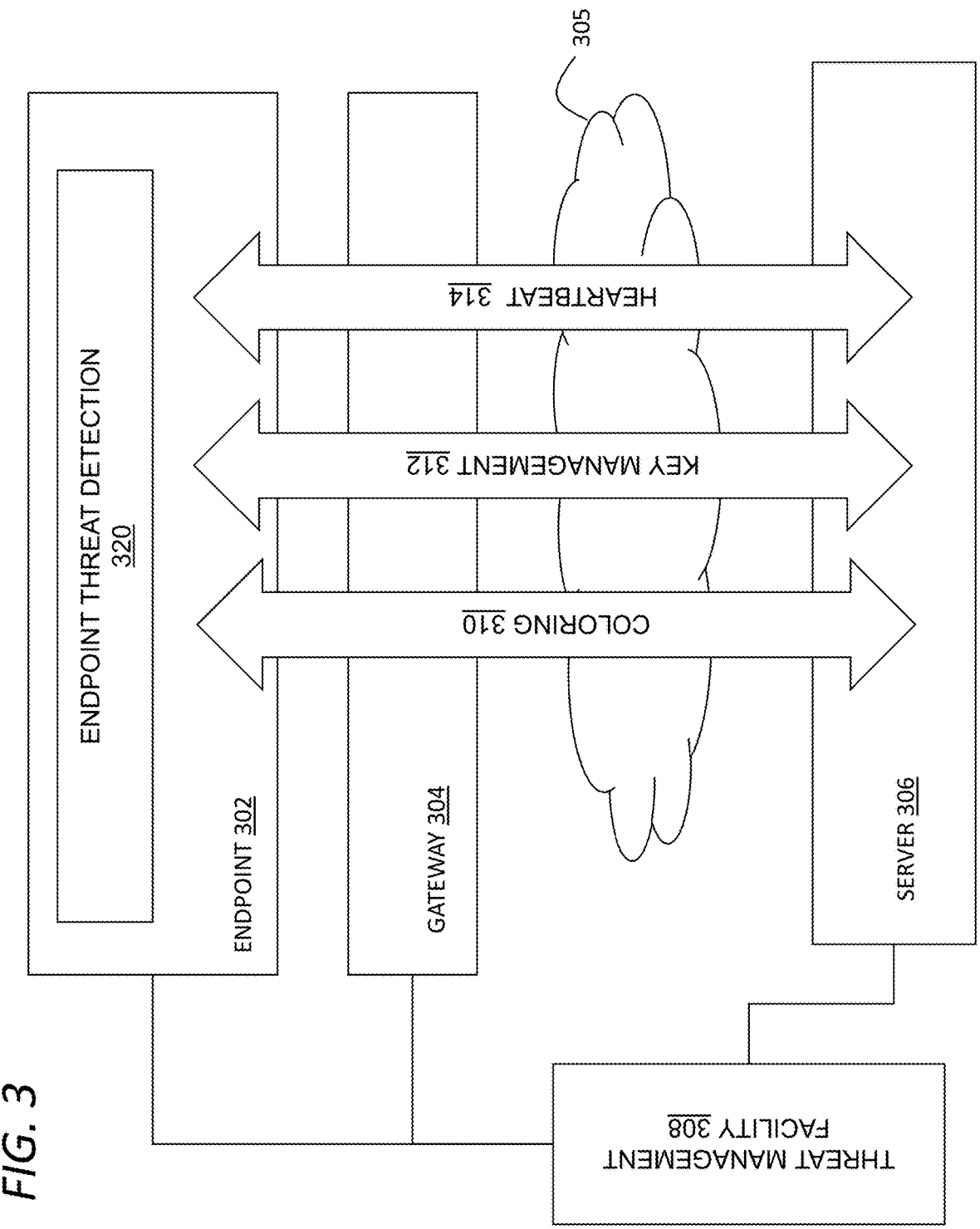
FIG. 3 illustrates a threat management system.

FIG. 3 illustrates a network which the systems and methods described may be implemented. In general, the system may include one or more endpoints 302, one or more gateways 304, one or more servers 306 and one or more threat management facilities 308 coupled to one another directly or indirectly through a data network 305. Each of the elements depicted may, for example, be implemented on one or more devices. One, two, or more of these elements may be included in a particular implementation. These elements may be locally or remotely located from each other, for example, across one or more of: a LAN, a WAN, a cellular network, a wifi network, a bluetooth network, one or more virtual private networks in a cloud services infrastructure, or the Internet. In a simple implementation, the endpoint 302 and gateway 304 may be located relatively proximate to each other, with the gateway 304 protecting the endpoint 302 from the network 305. The threat management facility 308 and the server 306 may be located elsewhere, and communicate with the endpoint 302 and the gateway 304 over the network 305. In various embodiments, aspects of the elements shown may be co-located or included in others. For example, the server 306 may include the threat management facility 308. For example, a gateway 304 may include a threat management facility 308 and a server 306, and so on.

In some implementations, one or more of the elements may be implemented within a cloud services infrastructure, on one or more instances. For example, the endpoint 302 may be in a first virtual private cloud and the gateway 304 may be in another virtual private cloud. The network 305 may be partially or entirely within the cloud services infrastructure.

An endpoint 302 is a device typically used by a user on a network. In some embodiments, the term endpoint 302 may refer to a computer system that may source data, receive data, evaluate data, buffer data, or the like (such as a user's desktop computer as an endpoint computer), and may include a gateway 304 or server 306 as a data evaluation endpoint computer system, a laptop as a mobile endpoint computer, a personal digital assistant or tablet as a hand-held endpoint computer, a mobile phone as an endpoint computer, or the like. In embodiments, an endpoint 302 may be a source or destination for data, including such components where the destination is characterized by an evaluation point for data, and where the data may be sent to a subsequent destination after evaluation. In cloud implementations, an endpoint may be instance that is configured, for example, as a user desktop, or, for example, as a web server. Any device in or outside of the cloud may be an endpoint 302.

In some embodiments, an endpoint computer threat detection facility 320 is located on an endpoint 302 to provide threat protection to a user. The endpoint threat detection facility 320 may be an application loaded onto the computer platform or computer support component, where the application may accommodate the plurality of computer platforms and/or functional requirements of the component. For instance, an endpoint 302 may be one of a variety of computer platforms, such as Windows, Macintosh, Linux, and the like, where the endpoint threat detection facility 320 may be adapted to the specific platform on which it is employed. Additionally, components may have different functions to serve within networked computer-based infrastructure. For instance, computer support components provided as hubs and routers, servers 306, gateways 304, and the like, may require unique security application software to protect their portion of the system infrastructure, while providing an element in an integrated threat management system that extends to incorporate computer resources under its protection.

The endpoint computer threat detection facility 320 may serve as a security agent on the endpoint 302 to provide a capability for recognizing indications of compromise, such as malware, or unexpected user behavior, or for data loss prevention. The endpoint computer threat detection facility 320 may provide virus and malware protection, security and control over access to resources on the endpoint, encryption/decryption capability, data loss prevention, and so on.

An endpoint computer threat detection facility 320 may protect an endpoint 302 from threats by providing network security capabilities, which may include a hardware gateway, software gateway, or combination of these, for example, that may control network traffic to and from the endpoint 320. The endpoint computer threat detection facility 320 may permit or deny communications based on a security policy. The endpoint computer threat detection facility 320 may be designed for use on and by endpoints, so that the protection is directed to the device on which it is installed. The endpoint computer threat detection facility 320 may be able to control network traffic by providing prompts when any or suspicious connections may be attempted and adapting security policy accordingly. The endpoint computer threat detection facility 320 may also provide some level of intrusion detection, which may allow the software to terminate or block connectivity where it suspects an intrusion is being attempted. The endpoint computer threat detection facility 320 may scan files for threats such as malware, for example, and for data loss prevention. Other features that may be provided by the endpoint computer threat detection facility 320 may include alerts about outgoing connection attempts, control of program access to networks, hiding the endpoint 302 from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like.

Some threats may not come through communication over a network like the Internet, but may be from devices that are physically connected to a network element such as an endpoint 302. The connection may be made from direct connection, such as through a USB port, or in physical proximity with a wireless connection, such as through a Bluetooth or wifi connection. These physical proximity threats may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. Techniques described may be implemented within an endpoint threat detection facility 320 to scan data read and stored by the endpoint, whether over networks or through other communications mechanisms. The endpoint threat detection facility 320 may scan a device prior to allowing data transfers, and may scan data transferred to or from a device and the endpoint 320. These scans may include scans for data loss prevention.

A gateway 304 may be a hardware or software device that may be configured to permit, deny, or proxy data through a computer network that has different levels of trust in its source of data. For instance, a local network may have a high level of trust, because the source of all data has been sourced from within the local network. An example of a low level of trust is the Internet, because the source of data may be unknown. A gateway 304 may be a boundary between threat levels, and may control the flow of threats between networks. A gateway 304 may include firewall capability, including without limitation a variety of capabilities for scanning, testing, and controlling communication across networks, including scanning for malware and for data loss prevention, and restricting access to networks or network addresses. In a cloud environment, a gateway 304 may be configured to provide protection across virtual private clouds, and to protect access from one virtual private cloud to another virtual private cloud.

One or more other systems may be distributed across these various components to support threat detection, such as a coloring system 310, a key management system 312 and a heartbeat system 314, each of which may include software components executing on any of the foregoing system components, and each of which may communicate with the threat management facility 308 and an endpoint threat detection agent 320 executing on the endpoint 302 to support improved threat detection and remediation. In various embodiments, different combinations of these systems 310, 312, 314 may or may not be included, depending on the requirements of a given implementation.

Techniques described above may be implemented in an endpoint 302, for example as part of an endpoint threat detection component 320. The endpoint threat detection component 320 may be configured to scan network traffic (e.g., web, email, other application traffic, etc.) and data stores available to the endpoint 302 to identify content. Likewise, the gateway 304 may include functionality to scan network traffic (e.g., web, email, other application traffic, etc.) and to provide other functionality to assure the security of the network.

The threat management facility 308 may provide protection from compromise, such as computer-based malware, including viruses, spyware, adware, Trojans, intrusion, spam, policy abuse, uncontrolled access, data loss prevention, and the like. The threat management facility may provide protection to one or more enterprise facilities such as a corporate, commercial, educational, governmental, entity or the like, and the protected facility's computer network may be distributed amongst a plurality of facilities, and in a plurality of geographical locations. In embodiments, the threat management facility 308 may be provided as a stand-alone solution. In other embodiments, the threat management facility 308 may be integrated into a third-party product. An application programming interface (e.g. a source code interface) may be provided such that the threat management facility 308 may be integrated. For instance, the threat management facility 308 may be stand-alone in that it provides direct threat protection to an enterprise or computer resource, where protection is subscribed to directly 308. Alternatively, the threat management facility 308 may offer protection indirectly, through a third-party product, where an enterprise may subscribe to services through the third-party product, and threat protection to the enterprise may be provided by the threat management facility 308 through the third-party product.

The threat management facility 308 may include a policy management facility that may include a set of rules or policies for access and permissions for the gateway 304 and the endpoint 302, such as access permissions associated with the network, applications, external computer devices, and the like. The policy may be stored in a database, a text file, a combination of databases and text files, or the like. In an embodiment, a policy database may include a block list, a black list, an allowed list, a white list, or the like that may provide a list of external network locations/applications that may or may not be accessed by the client facility. The policy may include rules that may be interpreted with respect to network access requests to determine if a request should be allowed. The rules may provide a generic rule for the type of access that may be granted. The rules may be related to policies for access rights. The rules may be related to documents and content of documents that may transit a network or be stored in data storage, or be uploaded or downloaded. The policies may be set through access to the threat management facility 308. The policies may be defined for application type, subset of application capabilities, organization hierarchy, computer facility type, user type, network location, time of day, connection type, or the like. Policies may be maintained by the threat management facility, in association with a third party, or the like.

The threat management facility 308 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The coloring system 310 may be used to label or 'color' objects for improved tracking and detection of potentially harmful activity. The coloring system 310 may, for example, label files, executables, processes, network communications, data sources and so forth with any suitable technique. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 310 as contemplated herein. In some embodiments, the rules described above may be used to scan and color one or more files, based on the information that is determined to be included in the one or more files using techniques described.

The key management system 312 may support management of encryption keys for the endpoint 302 in order to selectively permit or prevent access to content on the endpoint 302 on a file-specific basis, a process-specific basis, an application-specific basis, a user-specific basis, or any other suitable basis in order to prevent data leakage, and in order to support more fine-grained and immediate control over access to content on the endpoint 302 when a potential or actual security compromise is detected. Thus for example, if a particular process executing on the endpoint is compromised, or potentially compromised or otherwise under suspicion, keys to that process may be revoked in order to prevent, e.g., data leakage or other malicious activity. Likewise, if private content is detected to be transiting a network, keys may be revoked for the process, endpoint, user, etc., in order to prevent, e.g., data leakage or other malicious activity, or keys may be used to encrypt files or portions of files to prevent data loss.

The heartbeat system 314 may be used to provide periodic or aperiodic information from the endpoint 302 or other system components about system health, security, status, and so forth. A heartbeat may be encrypted or plaintext, or some combination of these, and may be communicated unidirectionally (e.g., from the endpoint 308 to the threat management facility 308) or bidirectionally (e.g., between the endpoint 302 and the server 306, between the endpoint 302 and the gateway 304, or any other pair of system components) on any useful schedule. For example, a gateway 304 may provide a heartbeat to another gateway 304, to a server 306, or a threat management facility 308. Alerts and other information described above, for example, communicated to administrators or stored in logs, may be included in the heartbeat 314. Alerts and other information described above may be used to change a status indication or other information included in the heartbeat 314.

In general, various monitoring and management systems may cooperate to provide improved threat detection and response. For example, the coloring system 310 may be used to evaluate when a particular process is potentially opening inappropriate files, or whether files that are transiting the endpoint 302, a virtual private cloud, as determined, for example, by the endpoint threat detection component 320 or the gateway 304 may be indicative of compromise. The cooperation may be secured using the heartbeat 314, where an interrupted heartbeat from the heartbeat system 314 may also be indicative of compromise. In some implementations, the key management system 312 may then be deployed, for example, to revoke keys to the process, application, or the endpoint, so that no further files can be opened, deleted, transmitted or used otherwise. Likewise, the key management system 312 may be used to encrypt files that are transiting the endpoint 302 or the gateway 304. More generally, the cooperation of these systems enables a wide variety of reactive measures that can improve detection and remediation of potential threats to an endpoint, or prevention measures that can protect information in a network.

One of the benefits of cloud infrastructure implementations is that instances of network resources may be started and stopped on demand, manually or automatically, for example, based on load or anticipated need. It may be beneficial, in a cloud environment, to provide outbound gateway protection that can flexibly handle traffic as resources are added, removed, have increased or decreased activity, experience network or instance interruption, etc. A goal of such a cloud protection system may be to provide both a flexible load capability and fault tolerance.

Figure 4:
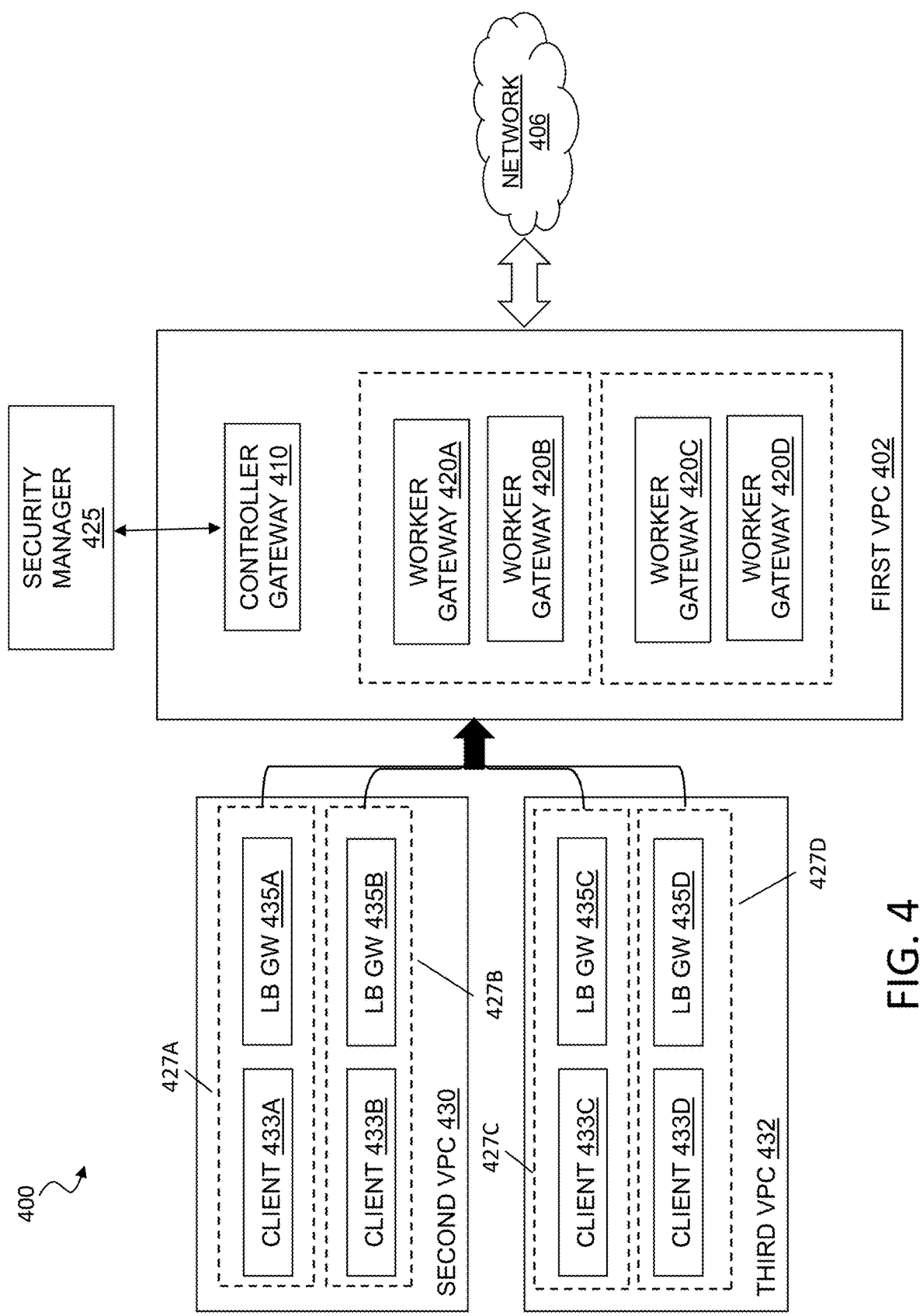
FIG. 4 illustrates a system for cloud network protection.

Referring to FIG. 4, in an aspect, an outbound gateway system 400 includes a first virtual private cloud 402. The first virtual private cloud 402 may be configured in a cloud provider network, for example, as one or more security zones within a network provided by an infrastructure-as-a-service provider, or a private cloud network, or any other suitable network. The first virtual private cloud 402 may be configured to communicate with other virtual private clouds, or to an external network 406. The external network 406 may be, as some examples, another internal network, another virtual private cloud, a wide area network, or the Internet. The first virtual private cloud 402 may have security settings and permissions configured so as to allow communication with other virtual private clouds 430, 432, and the network 406. In some implementations, the first virtual private cloud 402 includes one or more controller gateways 410 and worker gateways 420A-420D, generally 420, which are used to control and/or inspect network traffic, and, for example, protect applications running on instances in the other virtual private clouds 430, 432. The worker gateway(s) 420 may be used to control and/or inspect network traffic, for example, with firewall or network protection capabilities to protect against network intrusion and compromise. The worker gateways 420, individually and collectively, may serve as a firewall gateway(s) for endpoints located in the first virtual private cloud 402 or other virtual private clouds 430, 432. In some implementations, the other virtual private clouds 430, 432, include clients 433 that may make outbound network requests, and load balancer gateways 435A-435D, generally 435, which communicate the outbound network traffic to the worker gateways 420 in the first virtual private cloud 402.

In some implementations, the first virtual private cloud 402 includes a controller gateway 410 and one or more worker gateway(s) 420. The controller gateway 410 may be used to provision and monitor the worker gateways 420 and the load balancer gateways 435. The controller gateway 410 may be in communication with the one or more worker gateway(s) 420. In some implementations, the controller gateway 410 may also include worker gateway 420 functionality, and the operation of the controller gateway 410 may be determined by a configuration file. In some implementations, a virtual machine instance may include both controller gateway 410 functionality and worker gateway 420 functionality. In some implementations, a new controller gateway 410 is provisioned if a controller gateway 410 becomes unavailable. In some implementations, a second controller gateway (not shown) is provisioned and ready to assume the controller gateway responsibilities in a hot standby configuration. In some implementations, a worker gateway 420 may be configured to assume controller gateway 410 functions if the controller gateway 410 becomes unavailable.

In some implementations, the controller gateway 410 may be provisioned with a separate template than a worker gateway 420. In some implementations, the controller gateway 410 and the worker gateway(s) 420 may be provisioned from a single template, with an initial configuration as a controller gateway, a worker gateway, or both. A template in a cloud infrastructure may include, for example, a deployment description and configuration for how a service, application, or instance may be deployed, and may be used, for example, to provision services, applications, and instances. The controller gateway 410 may include a capability to provision or un-provision instances of worker gateway(s) 420. In some implementations, a cloud provider may provide auto-scaling services, so that the load of each of a group of instances is monitored, and instances may be started using a template and stopped as needed according to rules to manage load. In some implementations, worker gateways 420 may be managed as an auto-scaling group, so that new worker gateways 420 are provisioned or un-provisioned in the first virtual private cloud 402 as needed according to load. In some implementations, a controller gateway 410 may monitor load of worker gateways, and provision and un-provision instances of worker gateways 420 based on load or other factors.

The controller gateway 410 and the worker gateway(s) 420 may share certain information, for example, by using a shared data store. In some implementations, the shared data store may be a replicated, eventually consistent data store, such that one or more data files are distributed among the worker gateway(s) 420. In some implementations, the shared data store may be a storage service provided by cloud infrastructure. For example, AWS provides the simple storage service (S3). For example, configuration and state tables, may be stored in a shared file that is created and maintained by the controller gateway 410 and replicated to storage available to the worker gateway(s) 420 and accessed by the worker gateway(s) 420. In some implementations, a database or shared file system may be used to share information.

A second virtual private cloud 430 and third virtual private cloud 432 are examples of client virtual private clouds, separate from the first virtual private cloud 402, that includes one or more client(s) 433. The clients 433 may be any devices (e.g., endpoints) provisioned in the client virtual private clouds 430, 432, for example, that benefit from the protection of the worker gateways 420. For example, the clients 433 may be virtual desktops that are provisioned in a cloud infrastructure. For example, the clients 433 may be web servers or other servers that may make outbound network requests, and so benefit from worker gateway 420 protection.

In a cloud infrastructure implementation, client(s) 433 may be started and stopped as needed by client applications or implementations (e.g., on demand). For example, client(s) may be started and stopped manually or automatically or based on actual load or other factors, such as time of day, anticipated need, number of users, etc. The outbound gateway protection system can flexibly handle traffic as clients are added, removed, have increased or decreased activity, experience network or instance interruption, etc. This may involve adding or removing instances of worker gateway(s) 420, for example, based on load, or on network requirements. It therefore may be useful to provide a network protection system that can flexibly maintain operation as load balancer gateways 435 and worker gateways 420 are added, removed, have increased or decreased client activity, experience network or server interruption, etc. A goal of such a cloud protection system may be to provide high availability, scalability, and partition tolerance.

To that end, in some implementations, each of the client virtual private clouds 430, 432 include one or more load balancer gateways 435. The load balancer gateways 435 may be used to communicate outbound client traffic to worker gateway(s) 420. The load balancer gateways 435 may distribute outbound client traffic among the available worker gateways 420. For example, each connection from a client 433 may be assigned to one of the available worker gateways 420 so that the connections are distributed substantially evenly among the available worker gateways 420. The load balancer gateways 435 may be included in the same virtual private cloud 430, 432 as the client(s) 433, to facilitate efficient communication within the client virtual private clouds 430, 432. The load balancer gateways 435 may be included in a different virtual private cloud 430, 432 as some of the clients for availability. The load balancer gateways 435 may be instantiated as needed based on client activity. The load balancer gateways 435 may manage outbound communication between the client virtual private clouds 430, 432, and the network. The load balancer gateway(s) 435 may be provisioned from a template that may be used to configure virtual machine instances in one of the client virtual private clouds 430, 432. An administrator may use the controller gateway 410 to provision one or more load balancer gateway(s) 435. An administrator may provision one or more load balancer gateway(s) 435 manually or may allow the controller gateway 410 to provision load balancer gateway(s) 435 automatically, for example, based on the clients 433 and the virtual private cloud topology. In some implementations, the security manager 425 may be used to configure and provision load balancer gateway(s) 435, for example, by directing the controller gateway 410.

The controller gateway 410 may provide an interface for administration. In some implementations, an administration interface is a web interface. In some implementations, the controller gateway 410 may include a capability to manage a number of different systems for network security, such as endpoint protection, network protection, encryption and data loss prevention, etc. In some implementations, an administrator may direct the controller gateway 410 to provision (e.g., using a template) or provide configuration information to one or more worker gateway(s) 420. In some implementations, an administrator may direct the controller gateway 410 to provision (e.g., using a template) or provide configuration information to one or more load balancer gateways 435. In some implementations, an administrator may provide policies for the controller gateway 410 to communicate to the worker gateway(s) 420.

In some implementations, the controller gateway 410 may be configured to communicate with a security manager 425 for administration and reporting. The security manager 425 may provide a web-based interface for administrators to manage network security. In some implementations, the security manager 425 may include a capability to manage a number of different systems for network security, such as endpoint protection, network protection, encryption and data loss prevention, etc. The security manager 425 may include a capability to have policies that are enforced across different aspects of network security, so as to enforce the same policies in cloud-based gateways and local network gateways.

A controller gateway 410 may communicate with load balancer gateway(s) 435 to obtain administrative statistics for reporting. Worker gateway(s) 420 may establish and maintain a communication channel with the load balancer gateway(s) 435. For example, a communications channel between a load balancer gateway 435 and a worker gateway 420 may be used for communication of network traffic, such as outbound traffic and for a worker gateway 420 to confirm the active status of the load balancer gateway 435. The communications channel between a load balancer gateway 435 and a worker gateway 420 may be used for the worker gateway 420 to send requests for subnets to be handled by a load balancer gateway 435. Once initialized, a load balancer gateway may determine its initial configuration from requests of worker gateway(s) 420.

Each of the clients 433 may be assigned to a load balancer gateway. In some implementations, the assignment of a client to a load balancer gateway is based on routing within the virtual private cloud 430, 432. For example, the network infrastructure may be configured so that one of the load balancer gateways 420 receives communication from a client directed to a network gateway. For example, when a client 433 instance is provisioned, the client 433 instance may be assigned an address for a network gateway for the client 433 to use for routing network communication (e.g., a gateway address). The traffic from the client to the designated network gateway address assigned by the network infrastructure may be redirected by the network routing infrastructure to one of the load balancer gateways 435. Using the network infrastructure to route packets to the destination for outbound traffic avoids notifying the client or making changes to the client if the load balancer gateway 435 designated for the client changes. Avoiding changes to the clients 433 decreases the complexity of the clients 433, and may reduce maintenance and may make operation of the clients 433 more stable.

In some implementations, a first client 433A in a first subnet 427A will use a first load balancer gateway 435A as a network gateway, and a second client 433B in a second subnet 427B will use a second load balancer gateway 435B as a network gateway. For example each subnet 427A, 427B, generally 427 may include instances that are assigned to a set of network addresses. In some implementations, the first client 433A and the second client 433B may be configured to direct traffic to the same gateway network address, and the network may route the traffic for each subnet 427 to a respective load balancer gateway 435A, 435B that is assigned within the network infrastructure for that subnet 427. In case of failure of the second load balancer gateway 435B, the first load balancer gateway 435A may assume responsibility for the second subnet. At the request of worker gateway(s) 435, the first load balancer gateway 435A may notify the network to direct network gateway traffic from the second subnet 427B to the first load balancer gateway 435A. The second client 433B in the second subnet thus may use the first load balancer gateway 435A if the load balancer gateway 425B fails. Again, this may be accomplished through changes in the network infrastructure, without requiring notification or changes to the client 433B.

Each load balancer gateway 435 forwards traffic to and receives traffic from a worker gateway 420 selected by the load balancer gateway 435 for each connection. The load balancer gateway(s) 435 selects an available worker gateway 420 to use for each connection so as to distribute the load substantially evenly. For a new network connection from a client, the load balancer gateway 435 may, for example, select one of the worker gateways 420 randomly, pseudo-randomly, or using another distribution technique that attempts to evenly distribute the load among the available worker gateways 420.

In some implementations, the controller gateway 410 may provide information to the worker gateways 435 about the one or more load balancer gateway(s) 435. For example, this information may be determined when the load balancer gateway(s) 435 are provisioned. The information may include a list of the load balancer gateway(s) and their network addresses. The controller gateway 410 may be configured to assign one of the load balancer gateway(s) 435 to each client subnet 427 with an initial or preferred configuration. Assignments of load balancer gateways to subnets 427 may be determined by a vote of the worker gateway(s) 420, for example, by a majority of requests from the worker gateways.

In some implementations, based on the information that they have, the worker gateways 420 make requests to each of the load balancer gateways 435 that indicate the subnet(s) 427 that the respective load balancer gateway 435 should be responsible for. If the worker gateway 420 sees a change in the network, for example that a load balancer gateway 435 is added, or a load balancer gateway 435 is no longer reachable, the worker gateway may send one or more new requests to one or more load balancer gateways 435. When a majority of the worker gateways 420 have made a request for the load balancer gateway 435 to take responsibility for a subnet, the load balancer gateway 435 requests that the network infrastructure route the outbound traffic for that subnet to it. In some implementations, the load balancer gateway considers the votes only after a predetermined time period has passed (e.g., 3 seconds, 5 seconds, 10 seconds), for stability.

Thus, in some implementations, network traffic originating from a client 433A is routed to a load balancer gateway 435A, which in turn communicates the traffic across the boundary of the second virtual private cloud 430 to a worker gateway 420, in this example worker gateway 420A, located in the first virtual private cloud 402. The worker gateway 420A may examine the network traffic and as determined by applicable policy may forward traffic to the network 405 or another virtual private cloud. The worker gateway 420A may, as determined by applicable policy, examine and if appropriate communicate responses back to the load balancer gateway 435A for communication to the client 433A in the virtual private cloud 430.

In general, the cloud network infrastructure is configured to forward outbound gateway traffic from clients 433 to the designated load balancer gateway 435 for that subnet. In response to a failure, or based on load, network conditions, or for other reasons, worker gateways 420 may vote for a different load balancer gateway 435 to be responsible for a subnet 427, for example, another load balancer gateway 435B that is located in the same virtual private cloud 430, another load balancer gateway 435C in another geographic zone or another virtual private cloud 432. While in most cases it would be expected that a load balancer 435A, 435B in the same virtual private cloud 430 and the same subnet 427 would be assigned due to efficiency, the system may be flexible under a variety of circumstances.

It should be understood that the outbound gateway system 400 shown is one possible implementation, and variations may be expected in any other specific implementations. For example, there may be any number of first virtual private clouds 402 with worker gateways 420, and client virtual private clouds 430, 432. For example, a subset of worker gateways 420 may be provisioned in different virtual private clouds or in different physical or virtual zones. For example, some worker gateways 420A, 420B may be located in one zone and other worker gateways 420C, 420D may be located in another zone. This may allow for fault tolerance by maintaining operation even if one zone has technical difficulties. There may be any number of clients 433, and load balancer gateways 435. There may be any number of worker gateways 420, and in some cases multiple controller gateways 410 for redundancy or for the implementation of sub-groups. For example, for large installations, there may be a first set of worker gateways 420 and load balancer gateways 435 under the direction of a first controller gateway 410, and a second set of worker gateways 420 and load balancer gateways 435 under the direction of a second controller gateway (not shown). For example, in some installations, there may be one or more first virtual private clouds 402, and any number of instances and devices within the first virtual private cloud 402.

Figure 5:
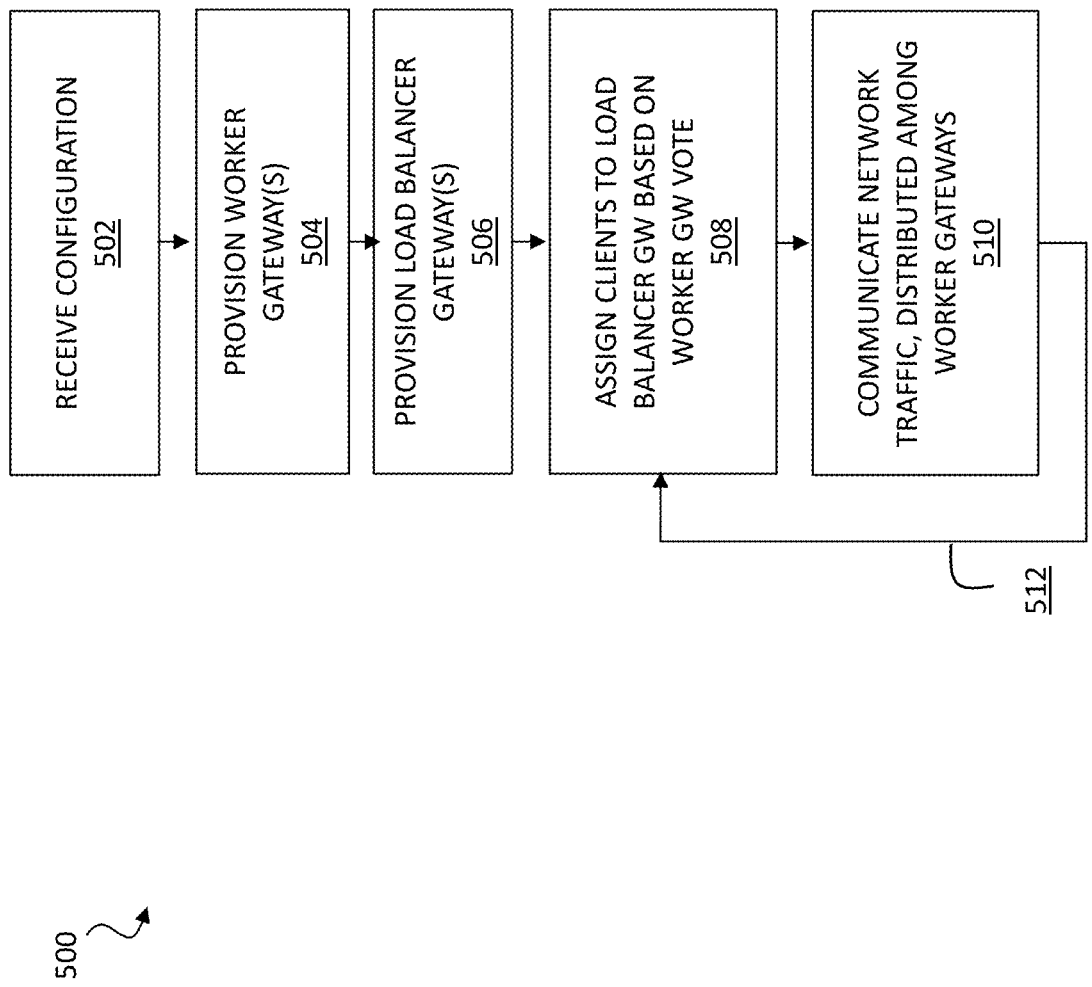
FIG. 5 illustrates a flowchart for cloud network protection.

Referring to FIG. 5, in an aspect, a method 500 for providing elastic outbound gateway protection includes receiving a configuring for the network, for example, by a controller gateway 502. The controller gateway may be provisioned from a template, and started by an administrator or, for example, by a security manager. The controller gateway 502 may be provisioned in a first virtual private cloud. The controller gateway may be configured with configuration data describing initial configuration information for one or more worker gateways and one or more load balancer gateways. For example, the controller gateway may be configured to create an auto-scaling group for worker gateways. For example, the controller gateway may be configured to create one or more load balancer gateways in one or more client virtual clouds. The controller gateway may be provisioned with the necessary templates. The security manager may provide one or more templates to a cloud management interface. The security manager may include credentials for an account with permissions to provision an instance in the virtual private cloud.

The method 500 may include provisioning one or more worker gateways 504. The one or more worker gateways may be provisioned from a template. The one or more worker gateways may be provisioned by a controller gateway in response to an administrator request. The one or more worker gateways may be provisioned in a first virtual private cloud. A subset of the worker gateways may be provisioned in a first virtual private cloud and a subset of the worker gateways may be provisioned in a second virtual private cloud. Each worker gateway may be provisioned with configuration data describing initial configuration information. Each worker gateway may be provisioned in response to a request of an administrator to a security manager. The security manager may request that the controller gateway provision an instance using a template. The controller gateway may provide the template to a cloud management interface. The controller gateway may be provisioned on an instance that has permissions to provision other instances in the cloud network, including the first virtual private cloud and client virtual private clouds. The controller gateway may include with a request to a cloud management interface credentials for an account with permissions to provision an instance in the applicable virtual private cloud.

The method 500 may include provisioning one or more load balancer gateways 506. The one or more load balancer gateways may be provisioned from a template. The one or more load balancer gateways may be provisioned in a client virtual private cloud (e.g., the same virtual private cloud as one or more client instances). A subset of the load balancer gateways may be provisioned in one client virtual private cloud and a subset of the load balancer gateways may be provisioned in another client virtual private cloud. Each load balancer gateway may be provisioned with configuration data describing initial configuration information. Each load balancer gateway may be provisioned by the controller gateway in response to an administrator request. The controller gateway may initialize an instance using a template. The controller gateway may provide the template to a cloud management interface. The controller gateway may be provisioned on an instance that has permissions to provision other instances in the cloud network, including the first virtual private cloud and client virtual private clouds. The controller gateway may include with a request to a cloud management interface credentials for an account with permissions to provision an instance in the applicable virtual private cloud.

The method 500 may include assigning clients among the one or more load balancer gateways 508. In some implementations, clients may be assigned in groups, such as by subnet. In some implementations, clients may be assigned by configuring network infrastructure, such that the client uses a gateway network address assigned by the network infrastructure, and network traffic from the client to the assigned gateway address is directed to the assigned load balancer gateway. This may have the advantage of allowing the assigned load balancer gateway to change to a different load balancer gateway by configuring network infrastructure rather than by making changes on the client. The change in load balancer gateway assigned to the client may then be transparent to the client, with perhaps some perceptible delay in some cases. For example, load balancer gateways and worker gateways may be created or fail, yet operation of the protection system may continue with no changes to the client needed.

In some implementations, groups of clients are assigned to a load balancer gateway based on their network, for example, based on the subnet in which the client is located in the network topology. Clients in a subnet may be assigned to one of the load balancer gateways by the network routing infrastructure at the request of a load balancer gateway. In some implementations, the load balancer gateway for a subnet may be determined by requests of the worker gateways, such that the majority of requests by worker gateways voting for a load balancer gateway to be responsible for a subnet determine that the subnet will be served by the load balancer gateway. The worker gateways may communicate their vote to the load balancer gateway about what subnets it should handle. In some implementations, each the worker gateway sends a request to each load balancer gateway to be responsible for a subnet whenever the worker gateways determine that the responsible load balancer gateway for that subnet should change. If a majority of the worker gateways request that a load balancer gateway be responsible for a subnet, the load balancer gateway may register with the network infrastructure to receive the outbound network traffic from the clients in that subnet.

In some implementations, each worker gateway has access to a configuration of preferred networks for each load balancer gateway. This configuration may be based on the network or zone of the load balancer gateway. This configuration may be based on a desire for efficient network communication. This configuration may be based on a desire for redundancy across zones. This configuration may be determined by the controller gateway as it provisions load balancer gateways. Each worker gateway also may have information about which load balancer gateways are online. This information may be determined by communication between the worker gateway and the load balancer gateway. For example, a worker gateway may periodically send a message (e.g., a "ping" message) to the load balancer gateway to determine if it is online. The ping message may be a simple network message, such as a TCP/IP "ping" message, or may be more than that. For example, a ping message may be a message that includes additional information that the load balancer gateway may receive, and acknowledge, respond, or reply to with additional information. In some implementations, the ping message may be a REST API request. If the load balancer gateway responds within a predetermined time period (e.g., 2 seconds, 2.5 seconds, 3 seconds, 5 seconds, 10 seconds, etc.), the worker gateway may consider the load balancer gateway to be online. The worker gateway may use the configuration of preferred networks and the worker gateway's information about which load balancer gateways are online to determine which subnets the worker gateway may request that a load balancer gateway 435 should be responsible for. If the desired subnets for a load balancer gateway has changed since a previous request, the worker gateway will send a new request.

Likewise, each load balancer gateway 435 may use the periodic ping messages sent by the worker gateways 420 to determine whether the worker gateways are still available. For example, if each worker gateway 420 sends a ping message every 2.5 seconds, a period of time after which a ping message (or a number of ping messages) has not been received by the worker gateway 420 would indicate that the worker gateway is no longer available. When distributing network requests to worker gateways, a load balancer gateway may consider whether a ping message has been received within a threshold time period (e.g., 3 seconds, 5 seconds, 10 seconds, 15 seconds, etc.). In some implementations, if a ping message has not been received from a worker gateway within a 10 second threshold, the worker gateway is not considered to be available. Traffic will no longer be distributed to the unavailable worker gateway. In some implementations, upon determining that a worker gateway is no longer available, existing connections may be reset.

The method 500 may include distributing by the load balancer gateways network traffic among worker gateways 510. In some implementations, the load balancing is accomplished using IP tables rules. Connections are marked on a per-connection basis (e.g., marked to indicate which worker gateway the connection is assigned to), and evenly distributed among the worker gateways 510. In some implementations, each connection may be assigned randomly by the load balancer gateway to one of the worker gateways with which the load balancer gateway has a connection. Worker gateways may be configured statically (e.g., manually) or dynamically. For dynamic configuration, worker gateways use interfaces to query the state of each load balancer gateway, and use that information to assign networks to the load balancer gateway. Thus, network traffic from a client is communicated to the network 406 via a load balancer gateway assigned to the client and the worker gateway assigned to the connection by the load balancer gateway, and network traffic from the network is communicated to the client via the worker gateway for that connection and the originating load balancer gateway.

At a later time 512, which may be periodically, or upon an event, such as when one or more load balancer gateways have changed state, a reassignment of one or more load balancer gateways to subnets 508 may occur. For example, as each worker gateway determines that the state of one or more load balancer gateways has changed, it will send requests to the load balancer gateways to accommodate the change.

For example, the worker gateways may check periodically for routing changes. Routing changes may be required, for example, by one of the load balancer gateways becoming unavailable, or by new load balancer gateways coming online. If another load balancer gateway has not responded to periodic ping messages (e.g., status inquiry messages) from a worker gateway, the worker gateway may send a request for a change in responsibility. In some implementations, the worker gateways store their last requests to the load balancer gateways 435, and only send requests that are different from previous requests. The worker gateways thus vote for subnets to be handled by the load balancer gateway. The load balancer gateway may wait a predetermined time period before changing responsibility, for example, to make sure that the requests are stable. For example, the load balancer gateway may only consider requests (votes) that have a predetermined age, for example, requests that are more than 5 seconds old.

In some implementations, the number of voting worker gateways must be higher than 1, and winning votes must be higher than 50%, to avoid a split e.g., where two worker gateways have different view of the network. So, for 2 worker gateways, 2 votes (100%) may be required for the load balancer to become responsible for a subnet; for 3 worker gateways, 2 votes (66.6%) may be required for the load balancer to become responsible for a subnet; for 4 worker gateways, 3 votes (75%) may be required for the load balancer to become responsible for a subnet, for 5 worker gateways, 3 votes (60%) may be required for the load balancer to become responsible for a subnet, etc. In some implementations, the votes must be older than a threshold time period (e.g., 5 seconds), to give each load balancer gateway time to respond to any ping messages, and to avoid short network interruptions.

In some implementations, a load balancer gateway will be marked as unavailable after a predetermined time period (e.g., 5 seconds, 10 seconds, 15 seconds, etc.) in which it has failed to respond to a ping message. This may be the time required for a number of ping messages (e.g., 2 ping messages, 3 ping messages, 4 ping messages, 5 ping messages, etc.). For example, with a 10 second time limit for the ping message response, and a 5 second required vote age, the system may respond to a failover in 15 seconds (5 seconds for vote age+10 seconds to mark load balancer as dead), and so the total failover time may be 15 seconds plus the time taken by the network infrastructure to change the routing table.

The load balancer gateway also may track the ping messages received from worker gateways 420 to determine whether worker gateways are available to distribute traffic. If ping messages have not been received within a threshold time period (e.g., 5 seconds, 10 seconds, 15 seconds, etc.), the worker gateway may be considered to be unavailable. Referring to FIG. 6, an example data structure and pseudo code for voting, for example as may be implemented in a worker gateway, is shown. In this example, as shown on line 601, includes three networks A, B, and C. In implementation, the networks A, B, and C may be represented, for example, by a subnet address, such as 172.10.10.0/24 or 172.10.12.0/24. The network subnets may be selected based on the networks that are availability for the client applications.

A configuration table such as that shown at lines 602-607 includes the identifier of a load balancer gateway, referred to in the example as Load Balancer ID. In this example there are 3 load balancer gateways, 1, 2, and 3. In various implementations, the load balancer gateways may be represented in any suitable manner, for example, by a generated Load Balancer ID, a host name, a domain name, an IP address identifier, etc. In some implementations, this table will be generated by the controller gateway, as it provisions load balancer gateways, and will be stored in a shared or replicated data store or in a database.

In the example configuration table shown at lines 602-607, load balancer 1 preferentially may respond to network A and to network B; load balancer 2 may preferentially respond to network C, load balancer 3 may preferentially respond to network A and network B.

A state table such as that shown in lines 608-613 shows the state of each load balancer gateway. In this example, "true" means online and "false" means not online. The information in the state table may be determined by the worker gateway by communicating with each load balancer gateway. The information in the state table may be determined by the worker gateway based on status requests made to the load balancer gateways. In some implementations, the information in the state table may be determined in another manner, for example, based on information available from one or more of the load balancer gateways, or from network infrastructure.

In the example, shown at lines 608-613, load balancer 1 is online 610, load balancer 2 is online 611, and load balancer 3 is not online 612.

Pseudocode is shown at lines 614-626 describing how a worker gateway would vote for each subnet in the net list 601. At lines 624-627, for each of the networks in the netlist 601, the find route routine is run. At lines 614-617, the find route routine checks each load balancer gateway in the configuration file. If the network is in the list for that load balancer gateway, and that load balancer is online, it returns that load balancer ID. At lines 620-623, it then checks the state of each load balancer in the state table, and returns the load balancer ID if it is true (online) in the state table, that is, it picks the first one in the list that is online.

Referring to FIG. 7, two demonstrative examples are presented a first scenario 702 and a second scenario 752. In the first scenario 702, there are a first load balancer gateway 715 is assigned to a first subnet 711. A second load balancer gateway 716 is assigned to a second subnet 712. Two worker gateways 718, 719 can communicate with both load balancer gateways 715, 716, and both worker gateways would request that the first load balancer gateway 715 would be responsible for the first subnet 711 and the second load balancer gateway 716 would be responsible for the second subnet 712.

In the second scenario 752, a second load balancer gateway 756 becomes unavailable. Both worker gateways 758, 759 determine that the second load balancer gateway 756 does not respond to status requests. As the worker gateways 758, 759 determine that the load balancer gateway has not responded to status requests within the predetermined time period, the worker gateways will send a routing change to the load balancer gateway 755. Both worker gateways 758, 759 request that load balancer gateway 755 be responsible for the first subnet 751 and the second subnet 752. In response, the first load balancer gateway 755 requests that the network routing infrastructure direct outbound traffic from both subnets 751, 752 to the first load balancer gateway 755. It these scenarios, the routing changes are accomplished without direction from the controller gateway (not shown) and without any changes being required to the clients on each of the subnets 751, 752.

Figure 8:
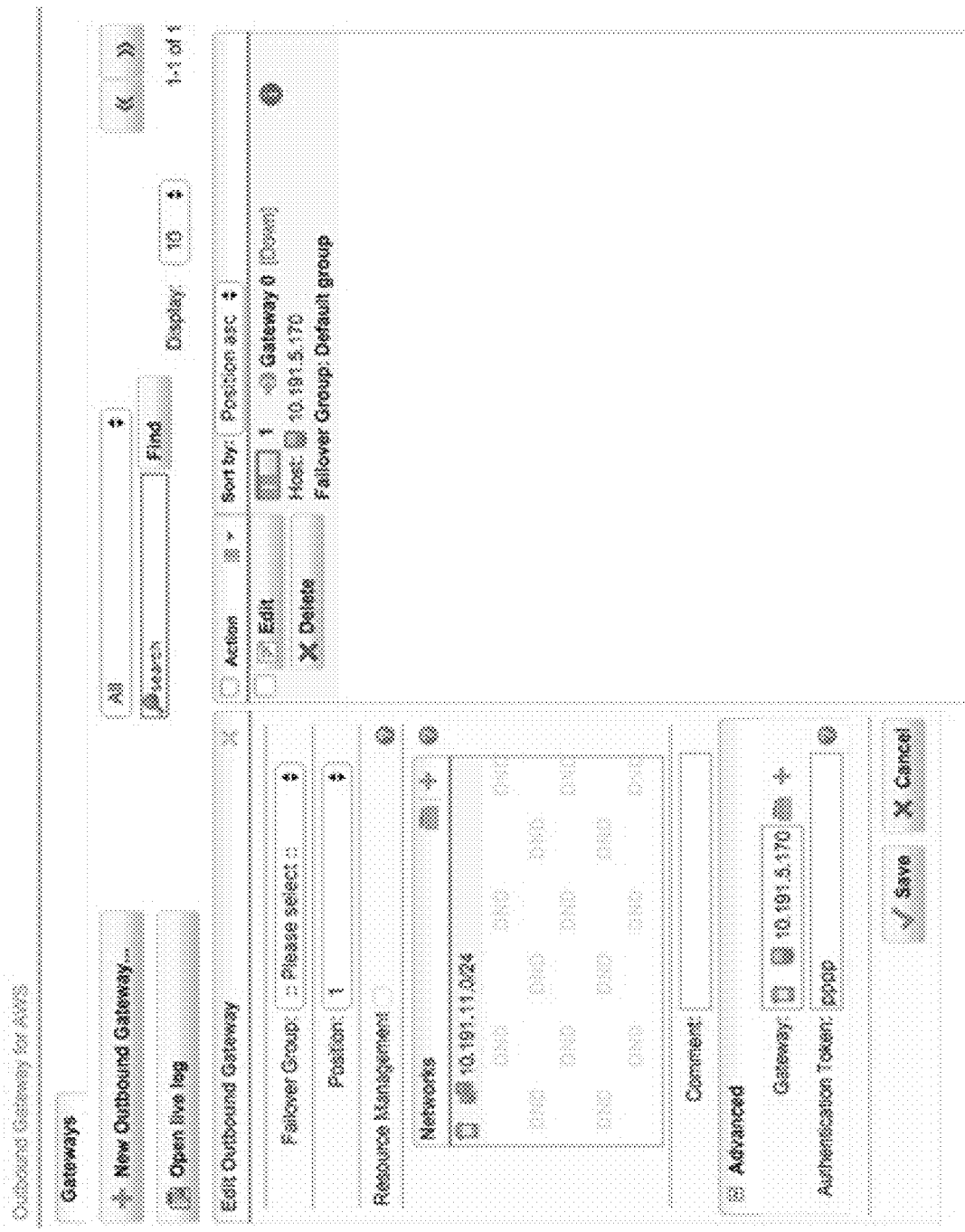
FIG. 8 shows an example screen display in an example implementation.

Referring to FIG. 8, an example screen display of a user interface enables manual configuration and/or deployment of a load balancer gateway. The user interface may be available to an administrator at a controller gateway, for example, or at a security manager. At interface block 802, for example, an administrator may enter an address and authentication token information for the load balancer gateway. Information about the load balancer gateway may be provided, as well as initial configuration information. In some implementations, the controller gateway uses the information provided by the administrator to deploy the requested load balancer gateway.

Figure 9:
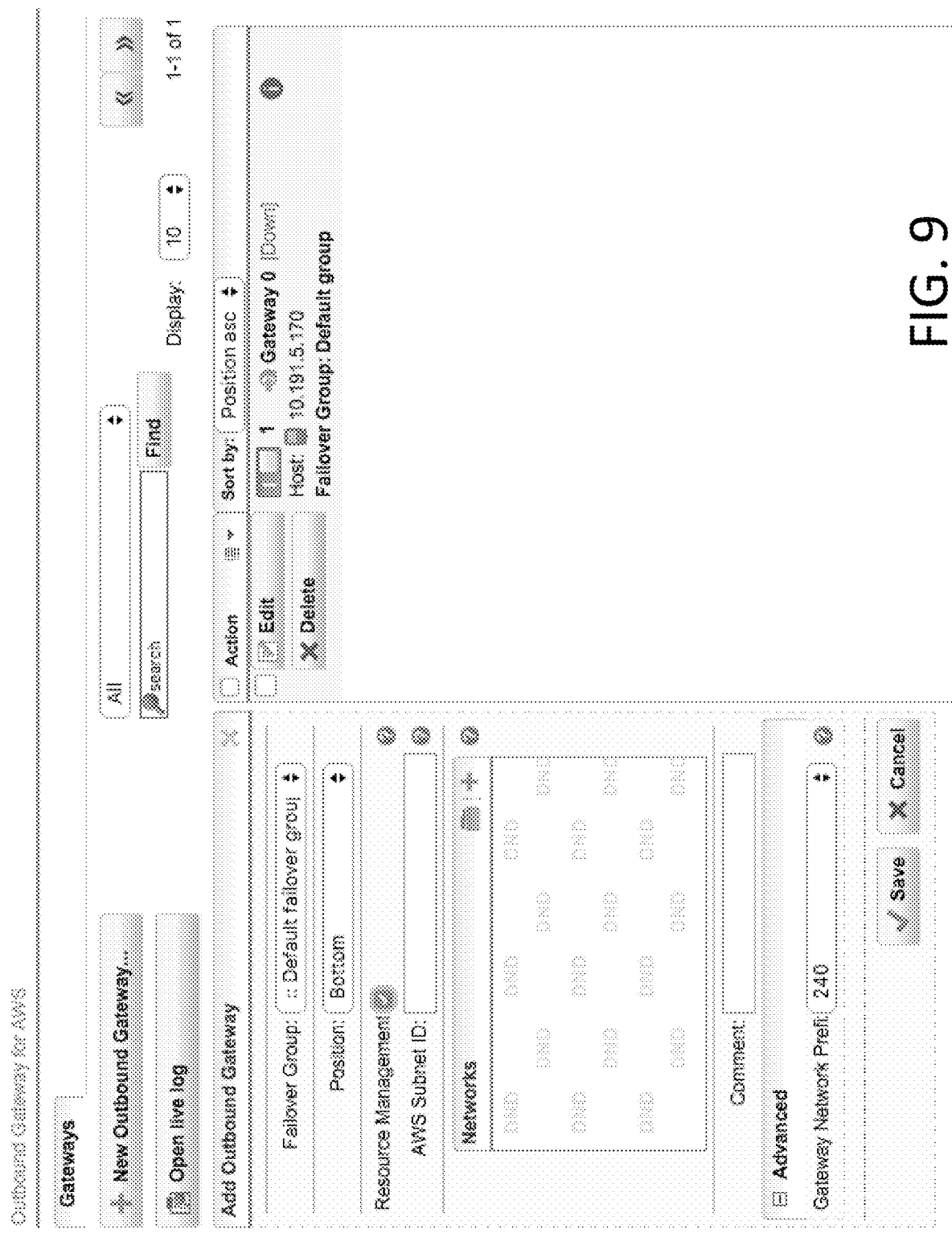
FIG. 9 shows an example screen display in an example implementation.

Referring to FIG. 9, an example screen display of a user interface enables an automatic deployment of a load balancer gateway. The user interface may be available to an administrator at a controller gateway, for example, or at a security manager. At 902, an administrator simply specifies the subnet ID and clicks save, and load balancer gateways will be deployed. This is much simpler than a manual configuration, because the controller gateway will determine the configuration parameters consistent with the network topology (e.g., the virtual private network configurations). For example, using automatic deployment, the setting of the subnet ID and starting the process may initiate the method 500 (FIG. 5).

Figure 10:
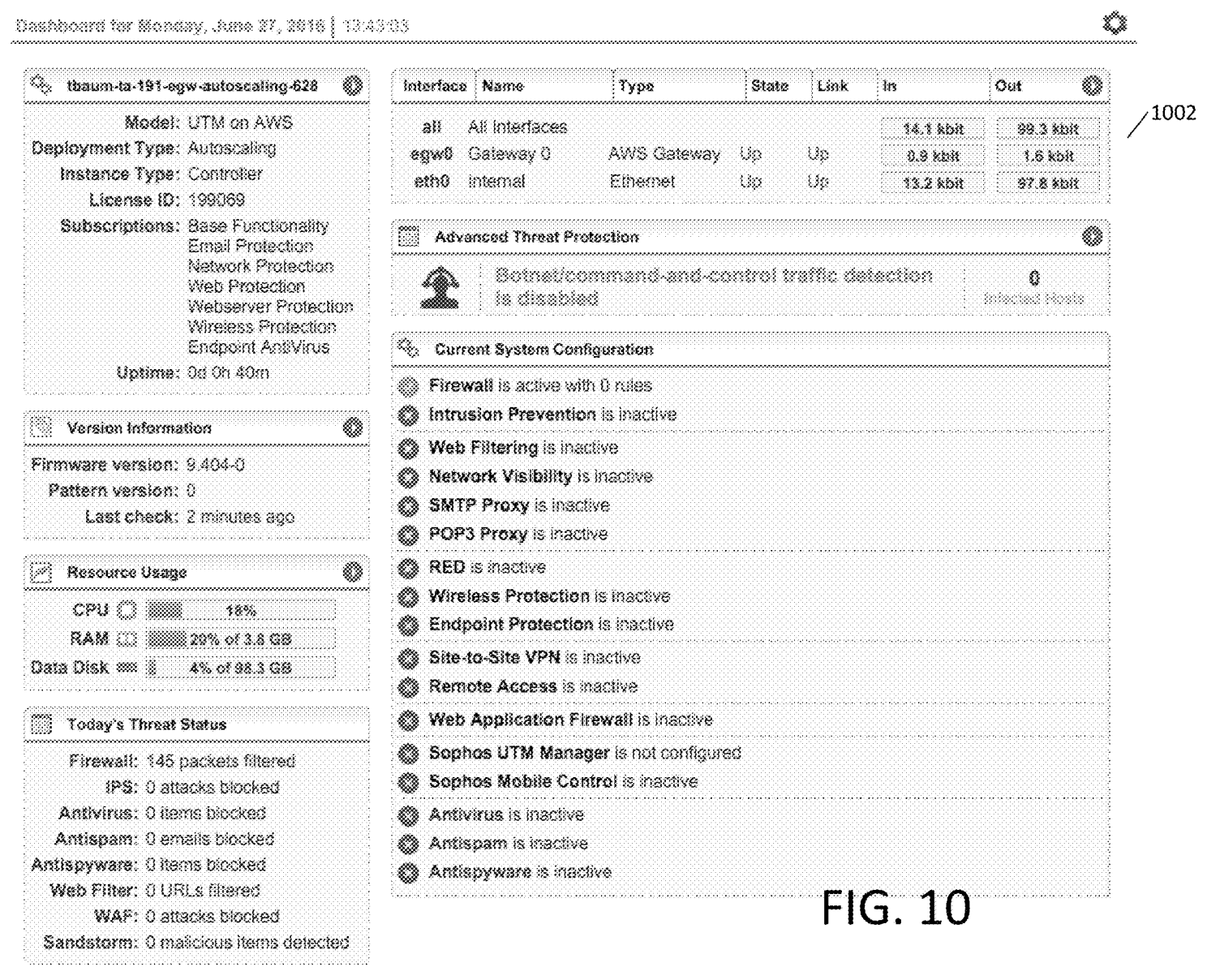

Referring to FIG. 10, an example screen display of a user interface presents a dashboard of a controller gateway with the current status of a load balancer gateway shown at 1002. The user interface may be available to an administrator at a controller gateway, for example, or at a security manager. Gateway egw0 is shown as an AWS Gateway that is up, with traffic statistics shown. In some implementations, clicking on the gateway will provide more detailed information.

Figure 11:
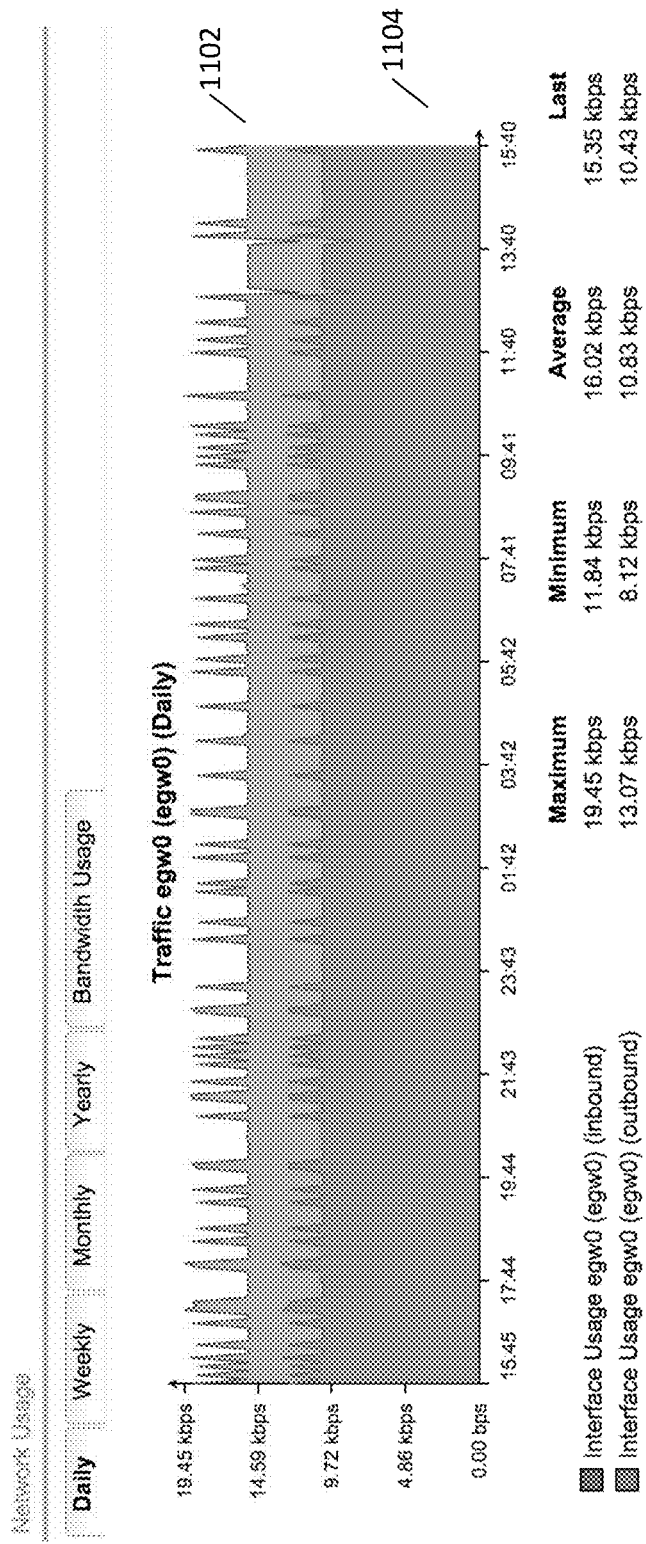
FIG. 11 shows an example screen display in an example implementation.

Referring to FIG. 11, an example screen display shows inbound traffic 1102 and outbound traffic 1104 at the load balancer gateway egw0. The traffic data may be viewed at different time scales (daily, weekly, monthly, yearly) and bandwidth usage may be displayed.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for providing an outbound gateway system, comprising:
   provisioning one or more worker gateways located in a first gateway virtual private cloud;
   provisioning one or more load balancer gateways in one or more client virtual clouds, the one or more client virtual clouds each comprising one or more clients, the one or more load balancer gateways communicating with an external network through the one or more worker gateways to distribute client requests among the worker gateways;
   receiving, from a controller gateway, configuration data for the one or more worker gateways and the one or more load balancer gateways;
   receiving a respective routing request as a vote from each of the one or more worker gateways, wherein each worker gateway votes when the respective worker gateway determines that changes to assignment of the one or more load balancer gateways are needed;
   assigning groups of the one or more clients to one of the one or more load balancer gateways based on votes for the one of the one or more load balancer gateways from a majority of the worker gateways; and
   communicating outbound network traffic from the clients to the external network via the one of the one or more load balancer gateways.

2. A network protection system, comprising:
   one or more worker gateways provisioned in a first gateway virtual private cloud, each worker gateway including a first memory having stored thereon computer executable code that, when executing on one or more computing devices, causes the respective worker gateway to request new routing as a vote;
   one or more client virtual clouds comprising one or more clients and one or more load balancer gateways, wherein each load balancer gateway includes a second memory having stored thereon computer executable code that, when executing on the one or more computing devices, cause the one or more load balancer gateways to communicate with an external network through the one or more worker gateways to distribute client requests among the worker gateways; and
   a controller gateway including a third memory having stored thereon computer executable code that, when executing on one or more computing devices, cause the one or more computing devices to provide configuration data for the one or more worker gateways and the one or more load balancer gateways, wherein the first memory of each of the one or more worker gateways has stored thereon computer executable code that, when executing on the one or more computing devices causes the respective worker gateway to vote when the respective worker gateway determines that changes to assignment of the one or more load balancer gateways are needed, and the third memory of the controller gateway has stored thereon computer executable code that, when executing on the one or more computing devices, causes the controller gateway to assign the one or more clients to one of the load balancer gateways based on votes for the one of the one or more load balancer gateways from a majority of the worker gateways, and and the second memory having stored thereon computer executable code that, when executing on the one or more computing devices, causes the respective load balancer gateway to communicate outbound network traffic to the external network from the one or more clients assigned to the respective load balancer gateway.

3. The network protection system of claim 2, wherein the one or more worker gateways provide network protection for outbound traffic.

4. The network protection system of claim 2, wherein the one or more worker gateways are located in the first gateway virtual private cloud and a second gateway virtual private cloud.

5. The network protection system of claim 2, wherein each load balancer gateway reports status information to the controller gateway.

6. The network protection system of claim 2, wherein each routing request included in the vote from the worker gateways meets a threshold age.

7. The network protection system of claim 6, wherein the first memory has stored thereon computer executable code that, when executing on the one or more computing devices, causes the respective worker gateway to send a respective routing request upon a failure of one of the load balancer gateways to report.

8. The network protection system of claim 6, wherein each routing request in the vote from the worker gateways is counted by each load balancer gateway.

9. A system for cloud network protection, comprising:
a first non-transitory computer-readable medium having stored thereon computer executable code including a first template for a worker gateway deployable in a first virtual private cloud, the computer executable code of the first template for the worker gateway including instructions that, when executing on one or more computing devices, cause the worker gateway to receive outbound network traffic; and
a second non-transitory computer-readable medium further having stored thereon computer executable code including a second template for a load balancer gateway deployable in a second virtual private cloud different from the first virtual private cloud, the computer executable code of the first template for the worker gateway further including instructions that, when executing on the one or more computing devices, cause the worker gateway to control network traffic between the second virtual private cloud and an external network, to request new routing as a vote, and to vote when the worker gateway determines that changes to assignment of the load balancer gateway are needed, and the second template for the load balancer gateway further including instructions that, when executing on the one or more computing devices, cause the load balancer gateway to be assigned to one or more clients in the second virtual private cloud based on votes for the load balancer gateway from a majority of worker gateways in the first virtual private cloud, and to communicate the outbound network traffic from the one or more clients to the external network via the load balancer gateway assigned to the one or more clients.

10. The system of claim 9, wherein the computer executable code for the first template for the worker gateway further includes instructions that, when executing on the one or more computing devices, causes the worker gateway to provide network protection for outbound traffic.

11. The system of claim 9, wherein the computer executable code for the second template for the load balancer gateway further includes instructions that, when executing on the one or more computing devices, causes the load balancer gateway to report status information to a controller gateway.

12. The system of claim 9, wherein each routing request from each worker gateway meets a threshold age.

13. The system of claim 12, wherein the computer executable code for the first template for the worker gateway further includes instructions that, when executing on the one or more computing devices causes the worker gateway to send a request the load balancer gateway upon a failure of the load balancer gateway to report status information to a controller gateway.

* * * * *

UNITED STATES PATENT AND TRADEMARK OFFICE
CERTIFICATE OF CORRECTION

PATENT NO. : 10,686,758 B2
APPLICATION NO. : 15/636692
DATED : June 16, 2020
INVENTOR(S) : Vincent Maurice Landgraf It is certified that error appears in the above-identified patent and that said Letters Patent is hereby corrected as shown below:

In the Claims

In Column 40, Line 39, Claim 2, delete "and and the second memory having stored" and insert -- and the second memory having stored --.

Signed and Sealed this
Eighteenth Day of August, 2020

Andrei Iancu
*Director of the United States Patent and Trademark Office*